(12) United States Patent
Tomioka et al.

(10) Patent No.: US 7,903,402 B2
(45) Date of Patent: Mar. 8, 2011

(54) ELECTRONIC APPARATUS

(75) Inventors: Kentaro Tomioka, Sayama (JP); Satoshi Yokote, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/710,233

(22) Filed: Feb. 22, 2010

(65) Prior Publication Data

US 2010/0149750 A1 Jun. 17, 2010

Related U.S. Application Data

(63) Continuation of application No. 12/256,425, filed on Oct. 22, 2008, now Pat. No. 7,701,709, and a continuation of application No. 11/799,389, filed on May 1, 2007, now Pat. No. 7,511,956.

(30) Foreign Application Priority Data

May 23, 2006 (JP) ................................ 2006-143127

(51) Int. Cl.
*G06F 1/20* (2006.01)
*H05K 7/20* (2006.01)

(52) U.S. Cl. .......... 361/679.47; 361/679.48; 361/679.52; 361/679.54; 361/695; 361/697; 361/704; 361/709; 361/719; 165/104.33; 165/185; 454/184

(58) Field of Classification Search . 361/679.46–679.48, 679.52, 679.54–679.55, 361/690, 692, 694–695, 697–700, 702–704, 361/709, 719; 165/80.3–80.5, 104.33, 185; 174/15.2, 16.1, 16.3; 454/184
See application file for complete search history.

(56) References Cited

U.S. PATENT DOCUMENTS

| | | | |
|---|---|---|---|
| 4,733,335 A | 3/1988 | Serizawa et al. | |
| 6,094,347 A | 7/2000 | Bhatia | |
| 6,313,989 B1 | 11/2001 | Kuang | |
| 6,375,561 B1 | 4/2002 | Nicolai et al. | |
| 6,493,222 B2 | 12/2002 | DiFonzo et al. | |
| 6,599,090 B2 | 7/2003 | Ozaki et al. | |
| 6,616,525 B1 | 9/2003 | Giraldo et al. | |
| 6,744,631 B1 | 6/2004 | Chuang et al. | |
| 6,804,115 B2 * | 10/2004 | Lai | 361/695 |
| 7,113,399 B2 | 9/2006 | Hisano et al. | |
| 7,327,568 B2 * | 2/2008 | Lin | 361/679.48 |
| 7,336,489 B1 | 2/2008 | Chen et al. | |
| 7,388,745 B2 | 6/2008 | DeLuga et al. | |
| 7,573,710 B2 * | 8/2009 | Morino et al. | 361/679.55 |

(Continued)

FOREIGN PATENT DOCUMENTS

JP H03-93294 A 4/1991

(Continued)

OTHER PUBLICATIONS

English translation (with abstract) of JP 08-322114.

(Continued)

*Primary Examiner* — Robert J Hoffberg
(74) *Attorney, Agent, or Firm* — Knobbe Martens Olson & Bear, LLP

(57) ABSTRACT

According to one embodiment, a housing of an electronic apparatus includes a first sidewall portion provided with an air vent, a ceiling wall portion extending from an upper end of the first sidewall portion toward the outside of the housing, and a pair of second sidewall portions which extend from respective side end portions of the first sidewall portion toward the outside of the housing and are opposed to each other.

6 Claims, 16 Drawing Sheets

U.S. PATENT DOCUMENTS

| | | | |
|---|---|---|---|
| 7,643,284 B2 * | 1/2010 | Nakamura | 361/679.47 |
| 2004/0008487 A1 | 1/2004 | Hisano et al. | |
| 2004/0201958 A1 | 10/2004 | Lev | |
| 2005/0248918 A1 * | 11/2005 | Lin | 361/687 |
| 2005/0276018 A1 | 12/2005 | Moore et al. | |
| 2006/0232934 A1 | 10/2006 | Kusamoto et al. | |
| 2007/0146988 A1 * | 6/2007 | Yamagishi et al. | 361/687 |
| 2007/0251676 A1 | 11/2007 | Cheng et al. | |
| 2008/0037205 A1 | 2/2008 | Arisaka et al. | |
| 2008/0043436 A1 | 2/2008 | Hung et al. | |
| 2010/0079947 A1 * | 4/2010 | Aoki | 361/695 |

FOREIGN PATENT DOCUMENTS

| | | |
|---|---|---|
| JP | 6-41626 | 11/1994 |
| JP | H06-318124 A | 11/1994 |
| JP | H07-235778 A | 9/1995 |
| JP | H08-186388 A | 7/1996 |
| JP | 8-322114 | 12/1996 |
| JP | 11-219234 A | 8/1999 |
| JP | 11-233956 | 8/1999 |
| JP | 2000-222071 | 8/2000 |
| JP | 2001-007580 | 1/2001 |
| JP | 2001-144475 | 5/2001 |
| JP | 2005-142310 | 6/2005 |
| JP | 2006-019384 | 1/2006 |

PUBLICATIONS

English translation (with abstract) of JP 2005-142310.
English translation of JP 06-041626.
English Translation of Japanese Office Action dated Apr. 15, 2008.
English Translation of Japanese Office action dated Aug. 5, 2008.
An English Translation of Notice of Reasons for Rejection mailed by the Japan Patent Office for Japanese Patent Application No. 2008-258434 on Dec. 15, 2009.
English translation of Decision of Rejection mailed Jul. 20, 2010 by the Japanese Patent Office for Japanese Patent Application No. 2008-258434.

* cited by examiner

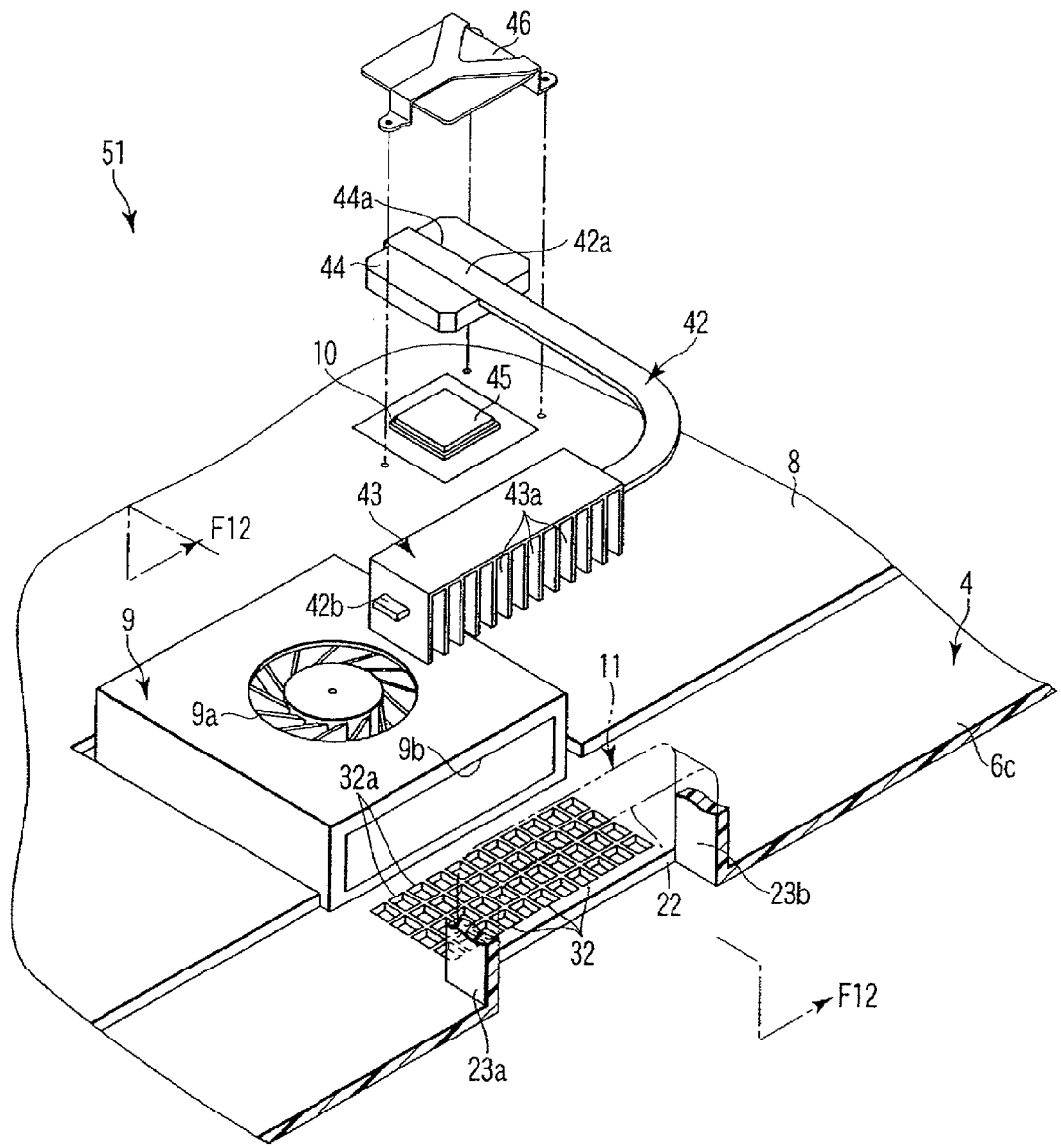
F I G. 11

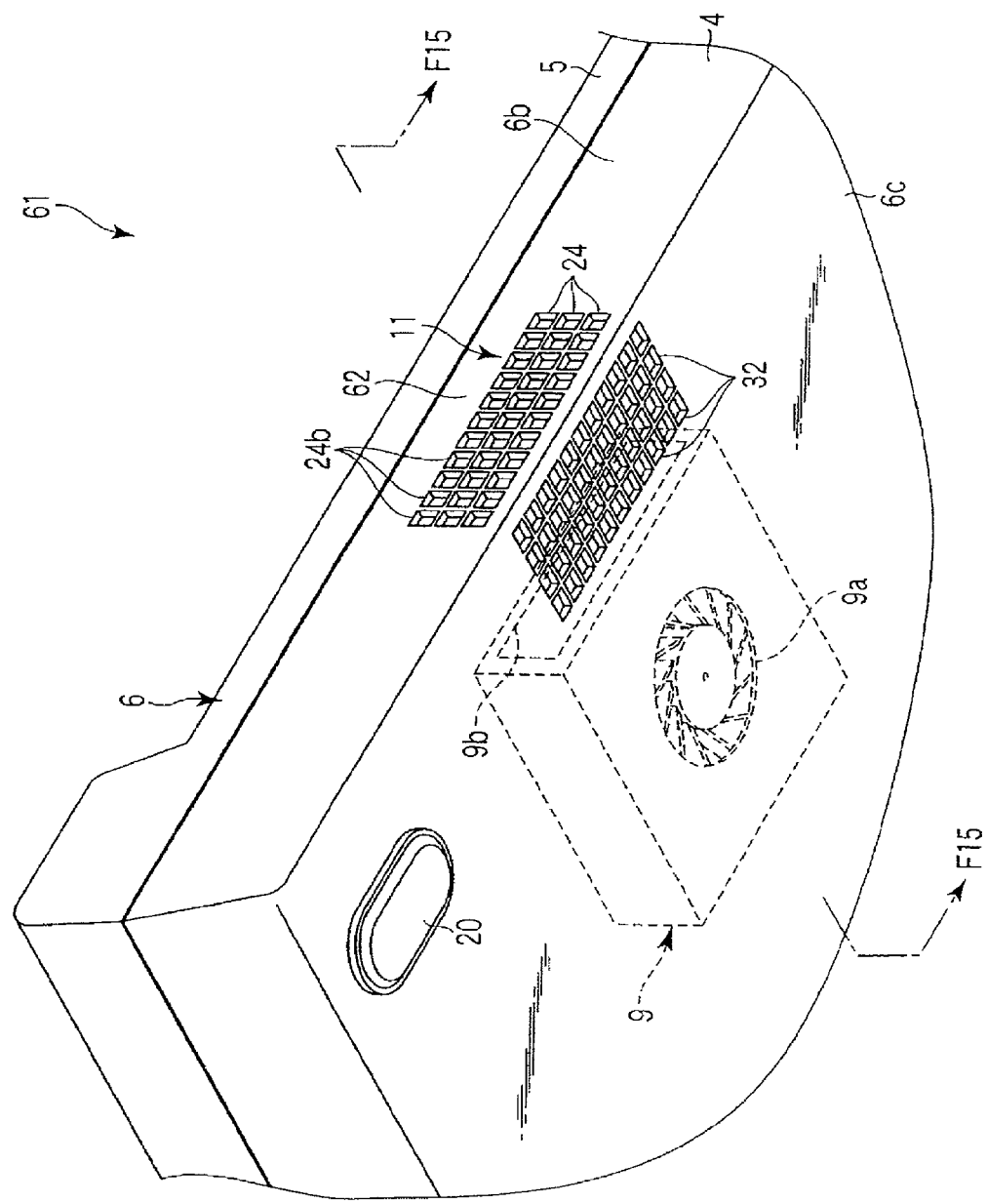
F I G. 13

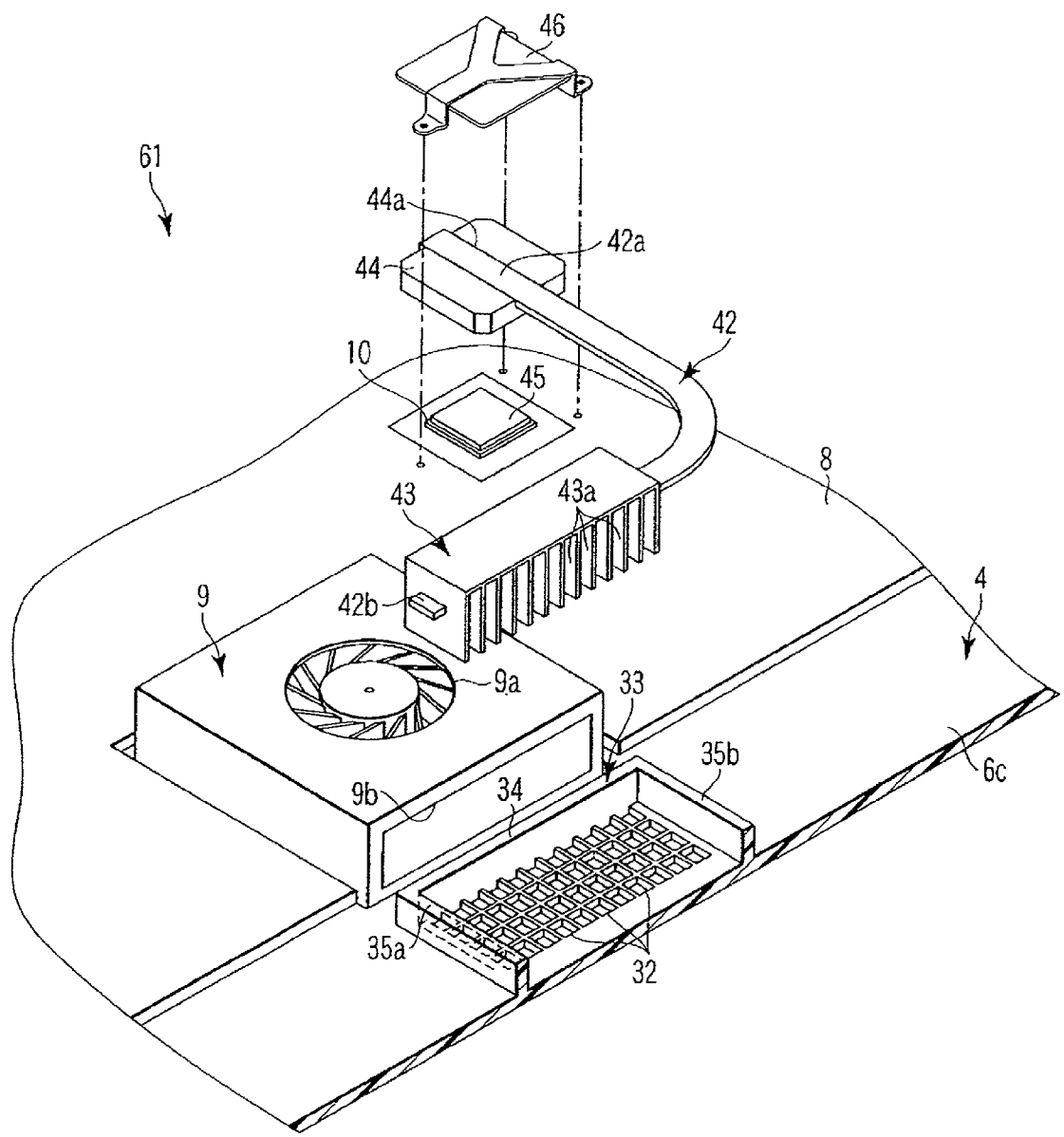
F I G. 14

ELECTRONIC APPARATUS

CROSS-REFERENCE TO RELATED APPLICATIONS

This application is a continuation of U.S. patent application Ser. No. 12/256,425, filed Oct. 22, 2008, and entitled "ELECTRONIC APPARATUS," which is a continuation of U.S. patent application Ser. No. 11/799,389, filed May 1, 2007, and entitled "ELECTRONIC APPARATUS," which is based upon and claims the benefit of priority from Japanese Patent Application No. 2006-143127, filed May 23, 2006, the entire contents of each of which are incorporated herein by reference.

BACKGROUND

1. Field

One embodiment of the present invention relates to an electronic apparatus including a housing with an air vent, for example, including a liquid-proof structure around the air vent.

2. Description of the Related Art

Electronic apparatuses such as portable computers have a cooling fan, used for cooling mounted parts, inside the housing thereof. The housing of such electronic apparatuses has air vents for taking in or out the air between the inside and the outside of the housing. If water or other liquid is accidentally spilled on such electronic apparatuses, the liquid may infiltrate into the housing through the air vents.

Jpn. Pat. Appln. KOKAI Pub. No. 8-322114 discloses an outdoor power switchboard which is aimed at preventing infiltration of rainwater into the main body. The outdoor power switchboard has a rain-checking board between a heat-radiating air inlet and a ventilating air inlet. A drain outlet is formed below the rain-checking board. Rainwater entered through the ventilating air inlet is blocked by the rain-checking board, and flows into the drain outlet.

Although the above rain-proof structure is preferable as a drip-proof structure for power switchboards, it cannot be applied to electronic apparatuses such as portable computers without any change. For example, if a rain-checking board is provided inside the housing of electronic apparatuses, a large dead space is formed in the housing. This interferes with reduction in size of electronic apparatuses, which is required recent years.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 11 is an exemplary perspective view of the inside of a portable computer according to a fourth embodiment of the invention;

FIG. 13 is an exemplary perspective view of a part of a portable computer according to a fifth embodiment of the invention;

FIG. 14 is an exemplary perspective view of the inside of the portable computer according to the fifth embodiment;

DETAILED DESCRIPTION

Various embodiments according to the invention will be described hereinafter with reference to the accompanying drawings. In general, according to one embodiment of the invention, a housing of an electronic apparatus includes a first sidewall portion provided with an air vent, a ceiling wall portion extending from an upper end of the first sidewall portion toward the outside of the housing, and a pair of second sidewall portions which extend from respective side end portions of the first sidewall portion toward the outside of the housing and are opposed to each other.

Embodiments of the present invention are explained below, with reference to drawings in which the present invention is applied to portable computers.

Figure 1:
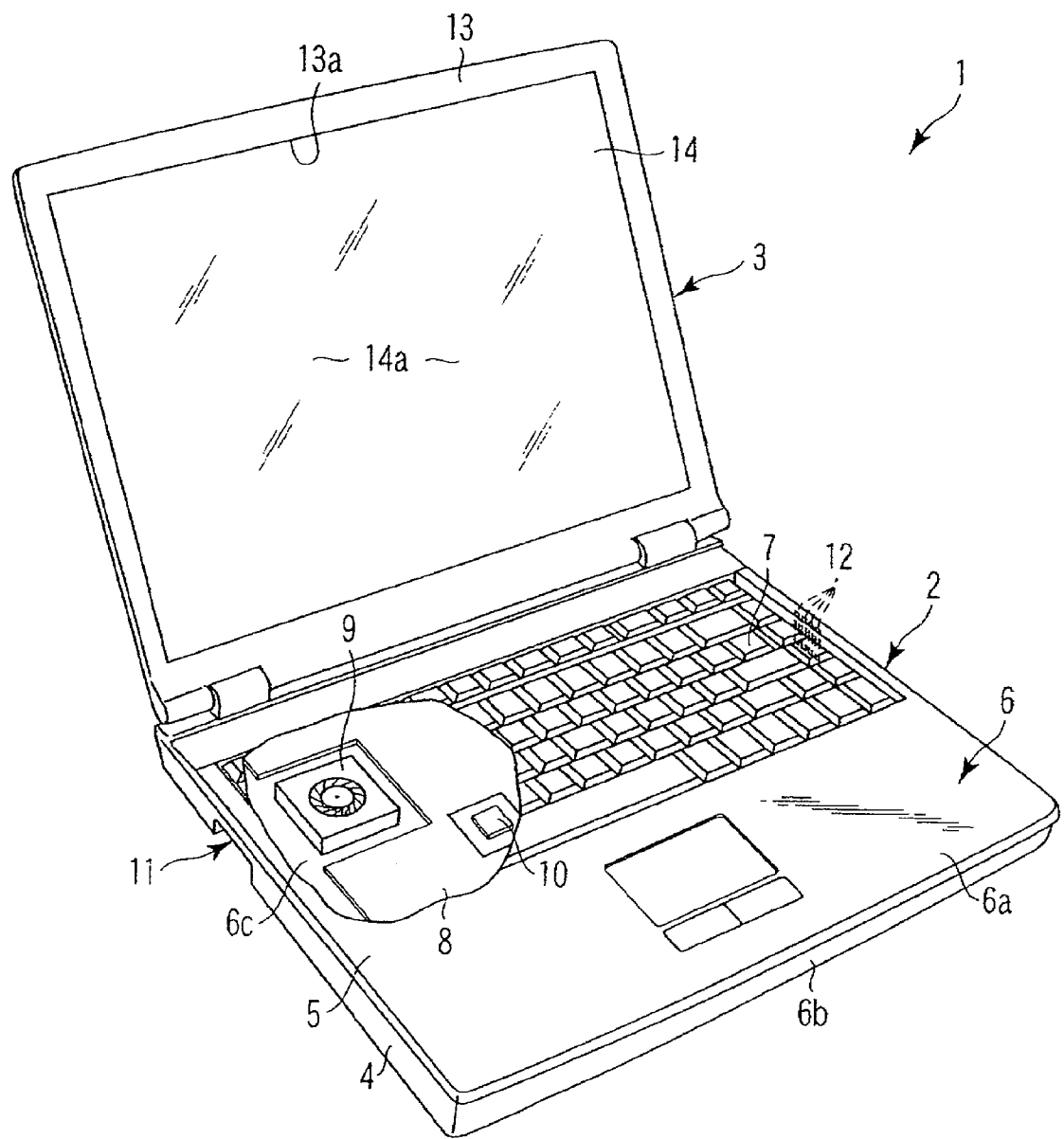
FIG. 1 is an exemplary perspective view of a portable computer according to a first embodiment of the invention.

FIGS. 1 to 4 illustrate a portable computer 1 serving as an electronic apparatus according to a first embodiment of the present invention. As shown in FIG. 1, a portable computer 1 is provided with a main body 2 and a display unit 3.

The main body 2 has a main body base 4 and a main body cover 5. The main body cover 5 is combined with the main body base 4 from above. With the main body base 4 and the main body cover 5 joined together, the main body 2 has a housing 6. The housing 6 has a top wall 6a, a peripheral wall 6b, and a bottom wall 6c. The top wall 6a supports a keyboard 7. The bottom wall 6c is provided with a plurality of leg portions 20. Therefore, when the portable computer 1 is placed on a placing surface F such as a desktop with the bottom wall 6c down, a space is generated between the bottom wall 6c of the housing 6 and the placing surface F.

The housing 6 contains a circuit board 8 and a cooling fan 9. A heat-generating component 10 is mounted on the circuit board 8. An example of the heat-generating component 10 is a CPU. An air vent portion 11 is provided in a part of the housing 6, facing the cooling fan 9. Further, the housing 6 has a plurality of air inlets 12. The air inlets 12 are opened to the inside of the housing 6.

The display unit 3 has a display housing 13, and a liquid crystal display panel 14 contained in the display housing 13. The liquid crystal display panel 14 has a display screen 14a. The display screen 14a is exposed to the outside of the display housing 13 through an opening portion 13a on the front surface of the display housing 13.

The display unit 3 is supported on a rear end portion of the housing 6 via hinge devices (not shown). Therefore, the display unit 3 is rotatable between a closed position in which the display unit 3 is laid down to cover the top wall 6a from above, and an opened position in which the display unit 3 stands to expose the top wall 6a.

Figure 2:
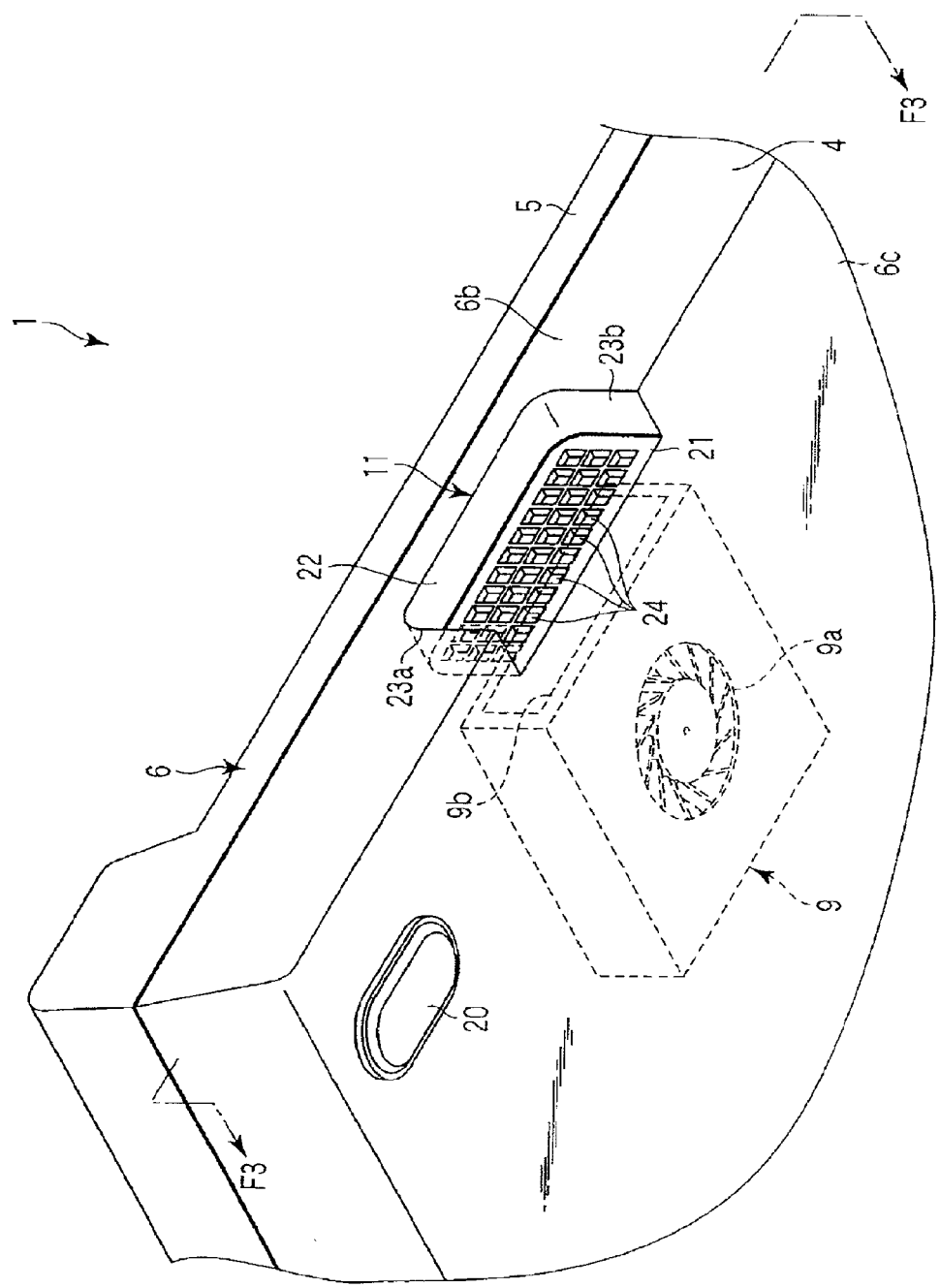
FIG. 2 is an exemplary perspective view of a part of the portable computer, including air vents, according to the first embodiment.

Next, the air vent portion 11 is explained in detail with reference to FIGS. 2 to 4. As shown in FIG. 2, the air vent portion 11 is provided in the housing 6, forms a part of an outside wall of the housing 6, and is exposed to the outside. The air vent portion 11 includes a first sidewall portion 21, a ceiling wall portion 22, and a pair of second sidewall portions 23a and 23b.

Figure 3:
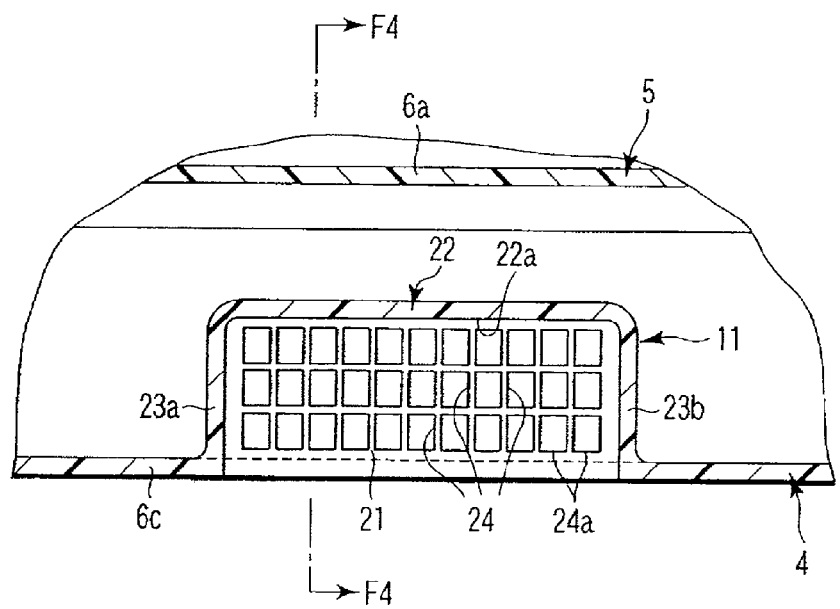
FIG. 3 is an exemplary cross-sectional view of the portable computer, taken along line F3-F3 of FIG. 2.
Figure 4:
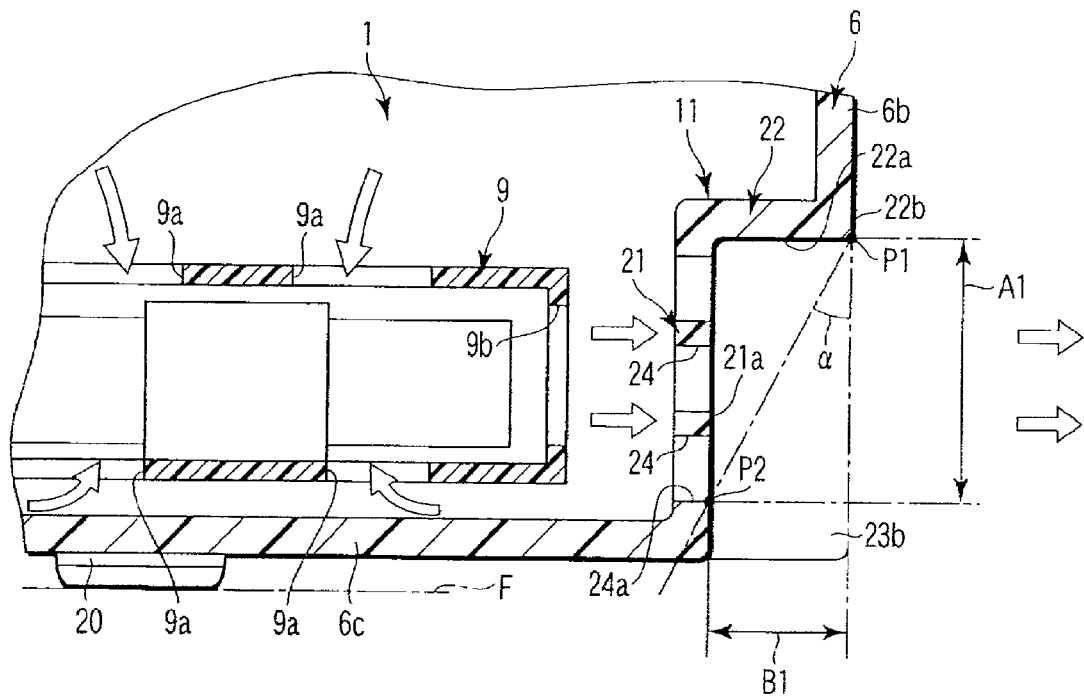
FIG. 4 is an exemplary cross-sectional view of the portable computer, taken along line F4-F4 of FIG. 3.

As shown in FIG. 4, the first sidewall portion 21 is formed in a position recessed from the peripheral wall 6b into the housing 6. The first sidewall portion 21 extends along a direction parallel to the peripheral wall 6b. As shown in FIG. 3, a plurality of air vents 24 are provided in the first sidewall portion 21 and opened to the inside of the housing 6. The air vents 24 are arranged in a grid pattern, for example.

As shown in FIG. 4, the ceiling wall portion 22 extends from an upper end of the first sidewall portion 21 toward the outside of the housing 6, for example, in the horizontal direction. An extended end of the ceiling wall portion 22 is connected to the peripheral wall 6b of the housing 6. In other words, the ceiling wall portion 22 extends from the housing peripheral wall 6b toward the inside of the housing 6, and the first sidewall portion 21 is formed on the extended end of the ceiling wall portion 22.

As shown in FIGS. 2 and 3, the second sidewall portion 23a extends from one side end of the first sidewall portion 21 toward the outside of the housing 6. Further, the second sidewall portion 23b extends from the other side end of the first sidewall portion 21 toward the outside of the housing 6. As an example, the second sidewall portions 23a and 23b extend wider than the thickness of the peripheral wall 6b. Extended ends of the second sidewall portions 23a and 23b are connected to the peripheral wall 6b of the housing 6.

The second sidewall portions 23a and 23b are opposed to each other. Upper ends of the second sidewall portions 23a and 23b are connected to respective side ends of the ceiling wall portion 22. Specifically, the first sidewall portion 21 is surrounded by the ceiling wall portion 22 and the second sidewall portions 23a and 23b, from three directions except the bottom. As described above, the air vent portion 11 is recessed from the peripheral wall 6b of the housing 6 into the housing 6.

Next, an example of the dimensional relationship of the wall portions is explained with reference to FIG. 4. The dimensional relationship in the first embodiment is an example of the present invention, and embodiments of the present invention are not limited to it.

As shown in FIG. 4, a vertical distance between a lower end 24a of an opening edge of a bottommost air vent 24 among the air vents 24 provided in the first sidewall portion 21 (hereinafter referred to as the lowermost edge 24a) and a lower surface 22a of the ceiling wall portion 22 is defined as length A1. A horizontal distance between an outer surface 21a of the first sidewall portion 21 and an end 22b, which is an outermost edge with respect to the housing 6, of the ceiling wall portion 22 (hereinafter referred to as the outer edge 22b) is defined as length B1. The length A1 and the length B1 are set to satisfy the following expression (1).

$$\text{length } B1 \geq \text{length } A1 \times \tan(15°), (\tan(15°) = 0.267949\ldots) \quad \text{Expression (1)}$$

The outer surface 21a of the first sidewall portion 21 indicates a wall surface exposed to the outside of the housing 6. The first sidewall portion 21 does not always have to include a plurality of air vents. The first sidewall portion 21 may have only one air vent 24. In such a case, the length A1 is a vertical distance between the lowermost edge 24a of the only one air vent 24 and the lower surface 22a of the ceiling wall portion 22.

The above relationship can also be expressed as follows. Specifically, if an angle formed between a straight line, which connects a lower end P1 of the outer edge 22b of the ceiling wall portion 22 with an outer edge P2 of the lowermost edge 24a of the lowermost air vent 24, and the vertical line is defined as an angle $\alpha$, the angle $\alpha$ is larger than 15°. The "outer edge" of the lowermost edge 24a of the air vent 24 is an edge of the air vent 24, which is located most outside with respect to the housing 6 among the air vent 24.

The cooling fan 9 is disposed inside the housing 6 and opposed to the air vents 24. The cooling fan 9 has an air inlet 9a which takes in the air, and an air outlet 9b which discharges the taken air. The air outlet 9b is opposed to the air vents 24. The cooling fan 9 discharges the air toward the air vents 24. The discharged air is discharged to the outside of the housing 6 through the air vents 24.

Next, operation of the portable computer 1 is explained.

When the cooling fan 9 is driven, the cooling fan 9 takes in the air in the housing 6, and discharges the taken air toward the air vents 24. Thereby, the air inside the housing 6, which has been heated by the heat-generating component 10, is discharged outside the housing 6. This promotes cooling of the heat-generating component 10 mounted in the housing 6.

According to the portable computer 1 including the above structure, the liquid proof around the air vents 24 is improved. Specifically, the portable computer 1 according to the first embodiment has the ceiling wall portion 22. The ceiling wall portion 22 functions as an eave for the first sidewall portion 21. Therefore, even when liquid is spilled over the portable computer 1 from above, the ceiling wall portion 22 reduces the possibility that the liquid enters the housing 6 through the air vents 24.

Since the air vent portion 11 is formed with the angle $\alpha$ set greater than 15°, there is little possibility that liquid dripping with an inclination angle smaller than 15° with respect to the vertical line enters the air vents 24. Specifically, in the portable computer 1 of the first embodiment, there is little possibility that liquid dripping within a range of 15° on the both sides of the vertical line infiltrates into the housing 6. Therefore, the portable computer 1 satisfies the requirements of JIS Level 2 (drip-proof type II) provided by JIS C 0920.

Since the second sidewall portions 23a and 23b are provided on the side end portions of the first sidewall portion 21, liquid proof against the liquid dripping slantingly in the wide direction of the portable computer 1 is further improved. The "wide direction" indicates a direction from one second sidewall portion 23b toward the other second sidewall portion 23a.

Next, a portable computer 31 serving as an electronic apparatus according to a second embodiment of the invention is explained with reference to FIGS. 5 to 8. Constituent elements having the same functions as those of the portable computer 1 of the first embodiment are denoted by the same reference numerals, and explanations thereof are omitted.

An air vent portion 11 of the portable computer 31 has a first sidewall portion 21, a ceiling wall portion 22, and a pair of second sidewall portions 23a and 23b. Air vents 24 are provided in the first sidewall portion 21. The air vent portion 11 is formed to satisfy the above expression (1).

Figure 5:
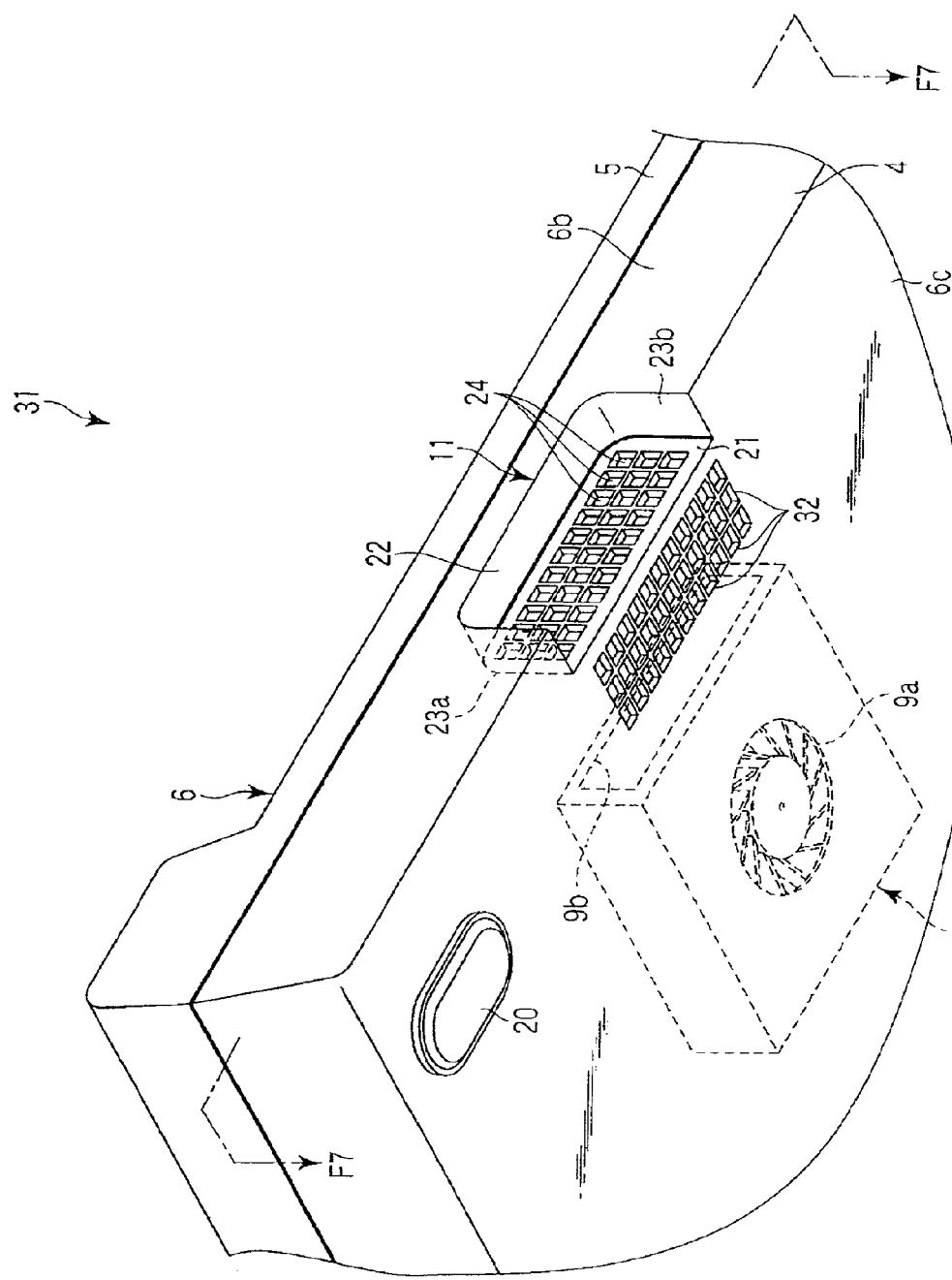
FIG. 5 is an exemplary perspective view of a part of a portable computer according to a second embodiment of the invention.

As shown in FIG. 5, a bottom wall 6c of the housing 6 extends from a lower end of the first sidewall portion 21. A plurality of liquid discharge holes 32 are provided in a part of the lower wall 6c of the housing 6, which is adjacent to the first sidewall portion 21. The liquid discharge holes 32 are arranged in a grid pattern, for example, and opened to the inside of the housing 6. The number of liquid discharge holes 32 may be one.

Figure 6:
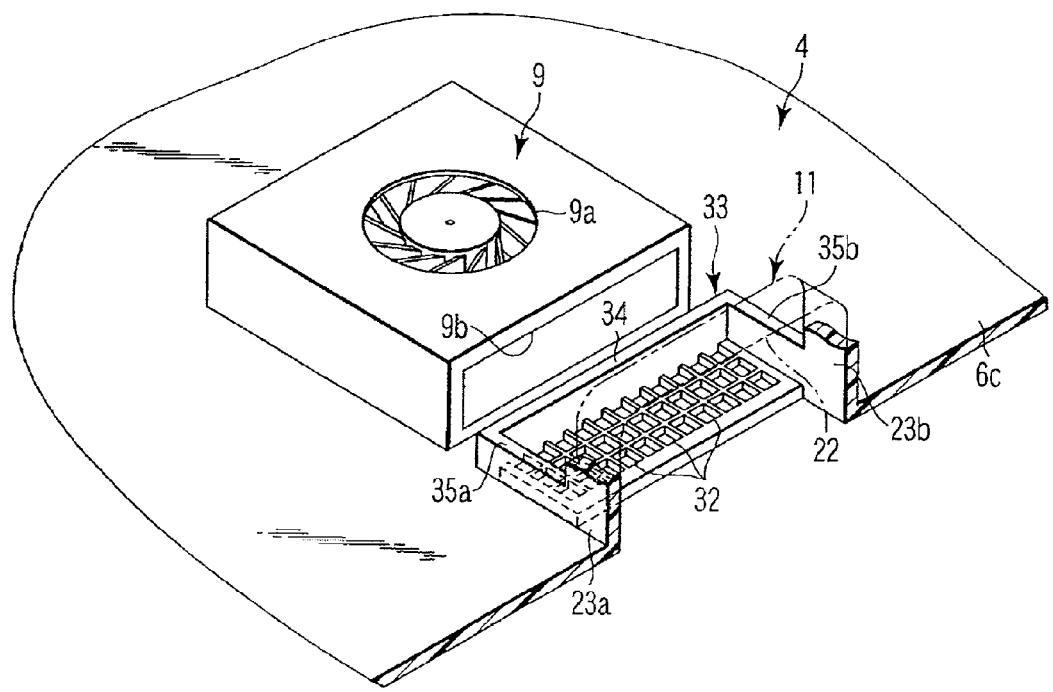
FIG. 6 is an exemplary perspective view of the inside of the portable computer according to the second embodiment.
Figure 8:
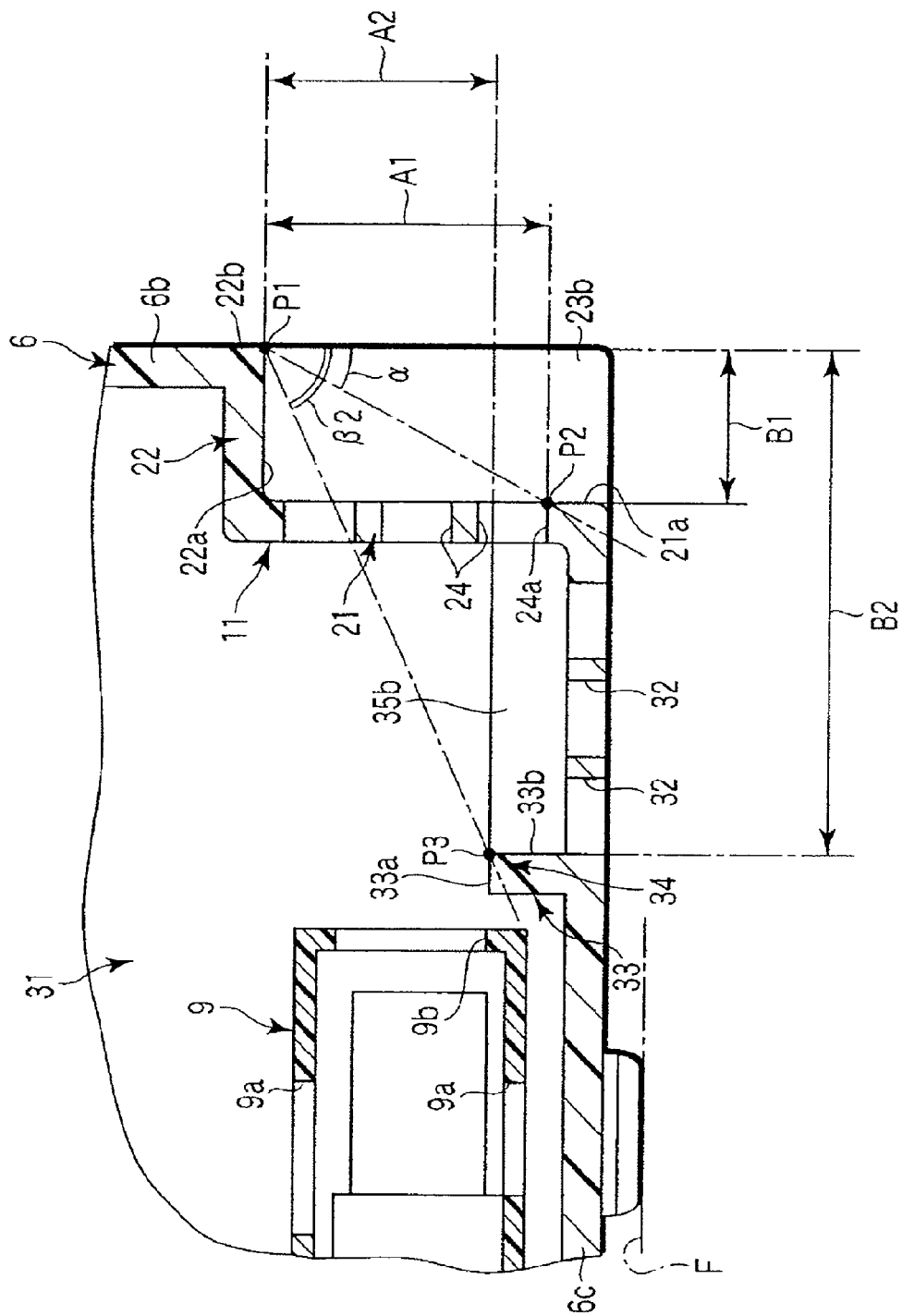
FIG. 8 is an exemplary cross-sectional view of the portable computer of the second embodiment, taken along line F8-F8 of FIG. 7.

As shown in FIGS. 6 and 8, a bank 33 is provided on the bottom wall 6c. The bank 33 stands upward from the bottom wall 6c inside the housing 6. An example of a bank 33 is a rib formed as one body with the bottom wall 6c of the housing 6. The bank 33 has a first standing wall 34 and a pair of second standing walls 35a and 35b. The first standing wall 34 is provided more inside the housing 6 than liquid discharge holes 32. Specifically, the first standing wall 34 is more distant from the first sidewall portion 21 than the liquid discharge holes 32 are. The first standing wall 34 extends along a direction parallel to the first sidewall portion 21. The liquid discharge holes 32 are opened between the first standing wall 34 and the first sidewall portion 21.

Figure 7:
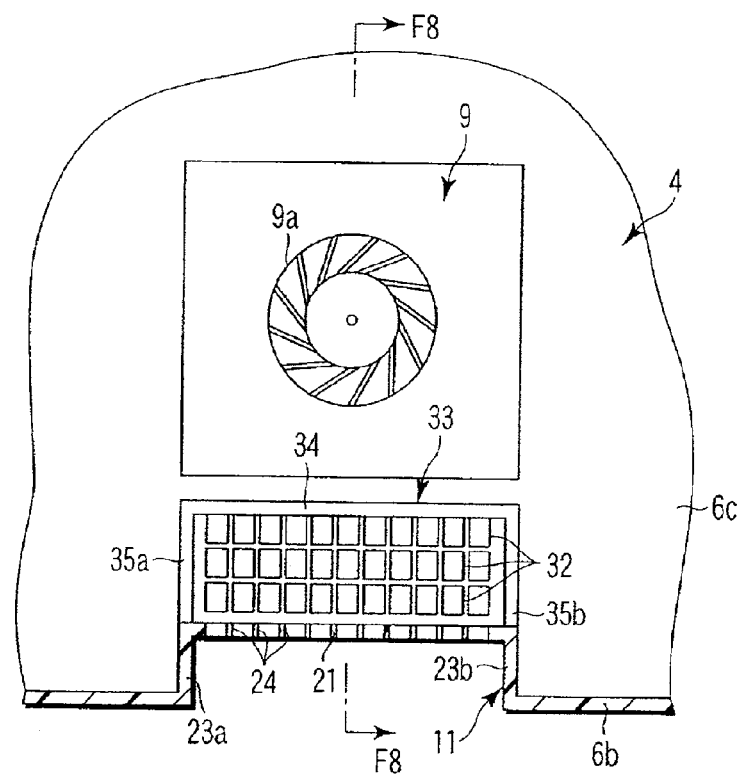
FIG. 7 is an exemplary cross-sectional view of the portable computer of the second embodiment, taken along line F7-F7 of FIG. 5.

As shown in FIG. 7, the second standing walls 35a and 35b extend from respective side end portions of the first standing wall 34 toward the second sidewall portions 23a and 23b, respectively, and are opposed to each other. Extended ends of the second standing walls 35a and 35b are connected to the second sidewall portions 23a and 23b, respectively. Specifically, the first standing wall 34 and the second standing wall 35a and 35b form the bank 33 in combination, which surrounds the liquid discharge holes 32 from three directions.

As shown in FIG. 8, the cooling fan 9 is provided more inside the housing 6 than the bank 33. The cooling fan 9 is disposed such that an air outlet 9b thereof is positioned higher than an upper end 33a of the bank 33.

Next, an example of the dimensional relationship between the air vent portion 11 and the bank 33 is explained with reference to FIG. 8. The dimensional relationship explained in the second embodiment is an example of the present invention, and embodiments of the present invention are not limited to it.

As shown in FIG. 8, a vertical distance between the upper end 33a of the bank 33 and a lower surface 22a of the ceiling wall portion 22 is defined as length A2. A side surface 33b of the bank 33 is opposed to the first sidewall portion 21. A horizontal distance between a side surface 33b of the bank 33 and an outer edge 22b of the ceiling wall portion 22 is defined as length B2. The length A2 and the length B2 are set to satisfy the relationship of the following expression (2).

$$\text{length } B2 \geq \text{length } A2 \times \tan(60°), (\tan(60°) = \sqrt{3}) \quad \text{Expression (2)}$$

The above relationship can also be expressed as follows. Specifically, when an angle formed between a straight line, which connects a lower end P1 of the outer edge 22b of the ceiling wall portion 22 with an upper end P3 of the side surface 33b of the bank 33, and the vertical line is defined as angle β2, the angle β2 is larger than 60°.

Next, operation of the portable computer 31 is explained.

Part of liquid dripping slantingly with an angle greater than 15° with respect to the vertical line may enter the inside of the housing 6 through the air vents 24. The liquid having entered the housing 6 through the air vents 24 is discharged to the outside of the housing 6 through the liquid discharge holes 32 opened in the bottom wall 6c of the housing 6.

According to the portable computer 31 with the above structure, the liquid proof around the air vents 24 is improved. Specifically, the portable computer 31 according to the second embodiment has the ceiling wall portion 22 and the second sidewall portions 23a and 23b. This structure improves the liquid proof for the same reason as that in the first embodiment.

Since the air vent portion 11 is formed to satisfy the above expression (1), liquid dripping slantingly with an angle smaller than 15° with respect to the vertical line hardly enters the air vents 24. Therefore, the portable computer 31 suppress infiltration of liquid into the housing 6, and thus satisfies the requirements of JIS Level 2 (drip-proof type II) provided by JIS C 0920.

Whether an electronic apparatus has the liquid proof provided by JIS C 0920 is judged by whether the electronic apparatus is adversely influenced under the provided conditions. Specifically, even if liquid infiltrates into the housing 6, the electronic apparatus is regarded as satisfying the JIS standard if the electronic apparatus is not adversely influenced by the infiltrating liquid. The portable computer 31 according to the second embodiment satisfies the requirements of JIS Level 2 (drip-proof type II) at a higher level that infiltration of liquid into the housing 6 is prevented in the first place.

The portable computer 31 has the liquid discharge holes 32 in the bottom wall 6c adjacent to the first sidewall portion 21. Thereby, even if liquid enters the housing 6 through the air vents 24, the liquid is discharged to the outside of the housing 6 without remaining in the housing 6.

Further, since the bank 33 is formed, the liquid entering the inside of the housing 6 is blocked by the bank 33, and the possibility that the liquid spreads into the inside of the housing 6 over the bank 33 is reduced. Since the bank 33 is formed, the liquid having infiltrated into the housing 6 is reliably guided to the liquid discharge holes 32.

Since the bank 33 and the ceiling wall portion 32 are formed to satisfy the above expression (2), there is little possibility that liquid dripping slantingly with an angle smaller than 60° with respect to the vertical line infiltrates into the housing 6 over the bank 33. Specifically, in the portable computer 31 according to the second embodiment, there is little possibility that liquid dripping within a range of 60° on both sides of the vertical line adhere to units and modules mounted inside the housing 6. Therefore, the portable computer 31 satisfies the requirements of JIS Level 3 (rainproof type) provided by JIS C 0920.

In summary, the portable computer 31 has liquid proof against liquid dripping with an angle within 60° with respect to the vertical line, with a level that mounted modules are not adversely influenced by liquid even when the liquid may enter the housing 6. Further, the portable computer 31 has liquid proof against liquid dripping with an angle within 15° with respect to the vertical line, with a level that the drips are prevented from entering the housing 6.

Since the liquid discharge holes 32 are opened in the bottom wall 6c, the air discharged from the cooling fan 9 is discharged to the outside of the housing 6 also through the liquid discharge holes 32. This structure increases the total cooling air discharge amount, and increases the cooling efficiency. Specifically, providing the liquid discharge holes 32 increases both the liquid proof and the cooling efficiency.

Since the air outlet 9b of the cooling fan 9 is located higher than the upper end of the bank 33, the air discharged from the cooling fan 9 is not obstructed by the bank 33, and the air-blowing efficiency of the cooling fan 9 is improved.

Next, a portable computer 41 serving as an electronic apparatus according to a third embodiment of the present invention is explained with reference to FIGS. 9 and 10. Constituent elements having the same functions as those of the portable computers 1 and 31 according to the first and second embodiments are denoted by the same reference numerals, and explanations thereof are omitted.

An air vent portion 11 of the portable computer 41 has a first sidewall portion 21, a ceiling wall portion 22, and a pair of second sidewall portions 23a and 23b. Air vents 24 are provided in the first sidewall portion 21. The air vent portion 11 is formed to satisfy the relationship of above expression (1).

Liquid discharge holes 32 and a bank 33 are formed in a bottom wall 6c of the portable computer 41. The bank 33 and the ceiling wall portion 22 are formed to satisfy the relationship of the above expression (2).

Figure 9:
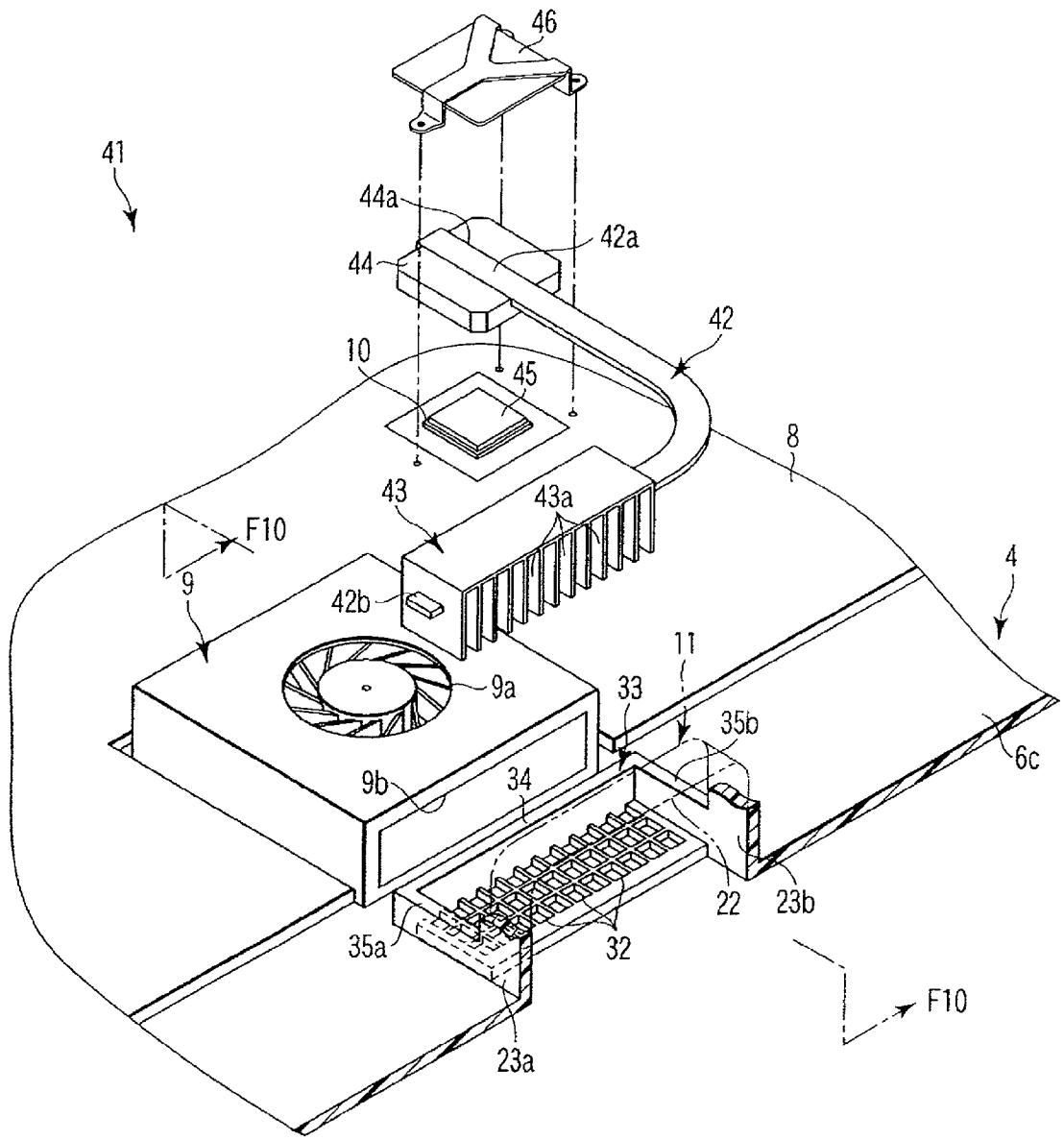
FIG. 9 is an exemplary perspective view of the inside of a portable computer according to a third embodiment of the invention.
Figure 10:
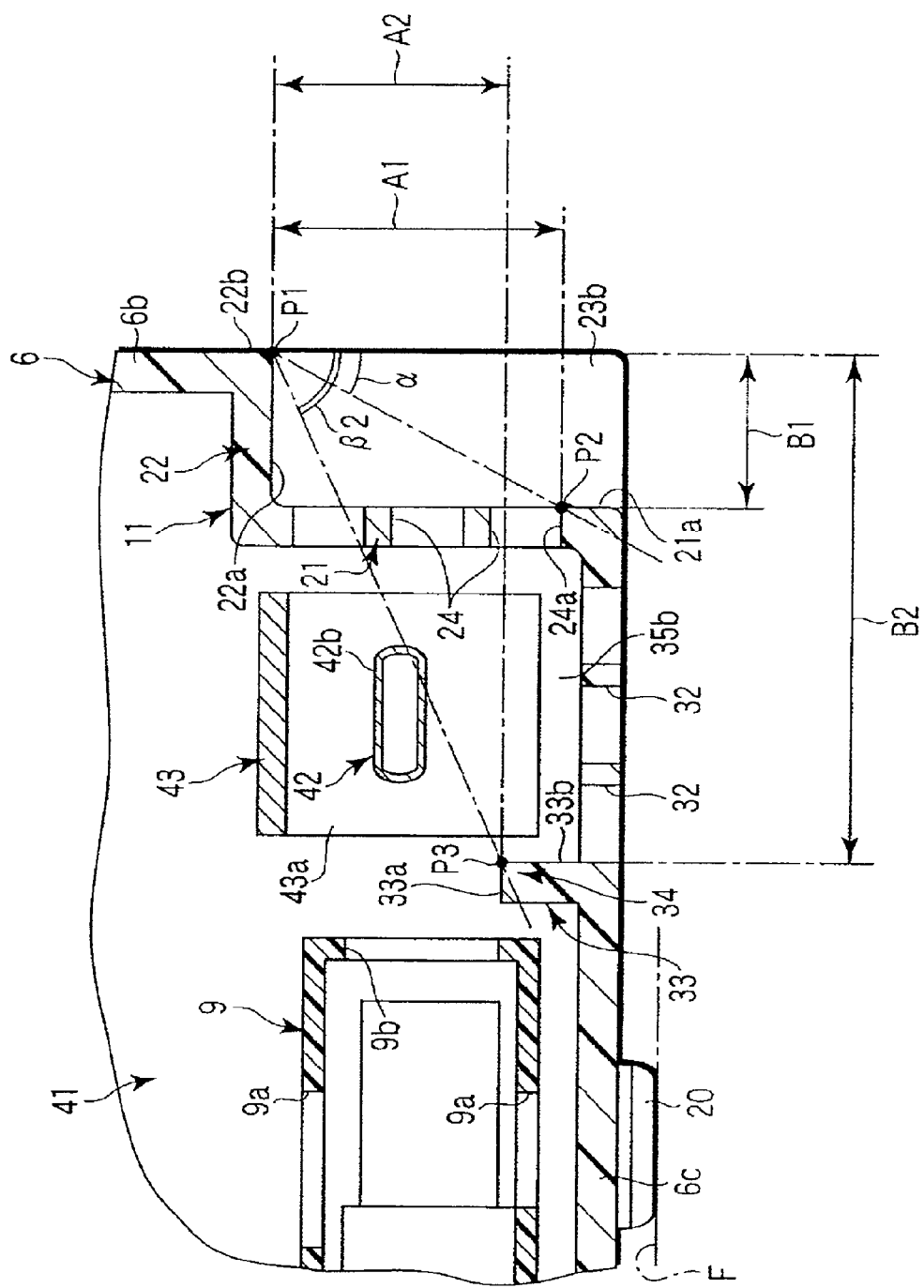
FIG. 10 is an exemplary cross-sectional view of the portable computer of the third embodiment, taken along line F10-F10 of FIG. 9.

As shown in FIG. 9, the portable computer 41 further includes a heat pipe 42 and a heat-radiating member 43. The heat pipe 42 is an example of a heat-transfer member. A heat-generating component 10 is thermally connected to one end portion 42a of the heat pipe 42. Specifically, the one end portion 42a of the heat pipe 42 is fitted into a groove 44a formed in a heat-receiving block 44. The heat-receiving block 44 is made of, for example, metal, and has a high thermal conductivity.

The heat-receiving block 44 is placed on the heat-generating component 10 with a heat-conducting member 45 interposed therebetween. An example of the heat-conducting member 45 is grease or a heat-conducting sheet. As shown in FIG. 9, the heat-receiving block 44 is fixed onto the circuit board 8 by using a fixing element 46. Thereby, the heat pipe 42 is thermally connected to the heat-generating component 10 via the heat-receiving block 44.

The other end portion 42b of the heat pipe 42 is thermally connected to the heat-radiating member 43. The heat-radiating member 43 has a plurality of fin elements 43a. The fin elements 43a are plate-like members each having a rectangular shape. The heat pipe 42 contains liquid inside, and moves heat between the end portions 42a and 42b by using heat of vaporization and capillarity. The heat pipe 42 transfers part of heat generated by the heat-generating component 10 to the heat-radiating member 43.

The heat-radiating member 43 is disposed, with the longitudinal direction thereof along the extending direction of the first sidewall portion 21. As shown in FIG. 10, the heat-radiating member 43 is located at the side of the air vents 24, and located above the liquid discharge holes 32. The heat-radiating member 43 is opposed to the air vents 24 and the liquid discharge holes 32. The heat-radiating member 43 is disposed between the first standing wall 34 and the first sidewall portion 21. Specifically, the heat-radiating member 43 is disposed between the cooling fan 9 and the first sidewall portion 21. The bottom of the heat-radiating member 43 is not closed by, for example, folding the fins.

The heat-radiating member 43 may be surface-treated such as Ni plating and other coatings to prevent rust. The heat-radiating member 43 may be made of metal such as anodized aluminum which is rust-resistant.

According to the portable computer 41 including the above structure, the liquid proof around the air vents 24 is improved. Specifically, the portable computer 41 according to the third embodiment has the ceiling wall portion 22 and the second sidewall portions 23a and 23b. This structure improves the liquid proof for the same reason as that in the first embodiment. Further, the portable computer 41 has the liquid discharge holes 32 and the bank 33. This structure improves the liquid proof for the same reason as that in the second embodiment.

Specifically, the portable computer 41 satisfies the requirements of JIS Level 3 (rainproof type) provided by JIS C 0920. Specifically, the portable computer 41 has liquid proof against liquid dripping with an angle within 60° with respect to the vertical line, with a level that mounted modules are not adversely affected by the liquid even when the liquid may enter the housing 6. Further, the portable computer 41 has liquid proof against liquid dripping with an angle within 15° with respect to the vertical line, with a level that the drips are prevented from entering the housing 6.

Since part of heat generated by the heat-generating component 10 is transferred by the heat pipe 42 to the heat-radiating member 43, cooling of the heat-generating component 10 is further promoted. The heat-radiating member 43 is disposed by effectively using a space formed above the liquid discharge holes 32, and thus downsizing of the housing 6 is achieved. Specifically, the heat-radiating member 43 which is not adversely affected by getting wet is disposed in the space above the liquid discharge holes 32, where it may get wet by the liquid passing therethrough. Thereby, layout effectively using the space in the housing 6 is achieved.

Next, a portable computer 51 serving as an electronic apparatus according to a fourth embodiment of the present invention is explained with reference to FIGS. 11 and 12. Constituent elements having the same functions as those of the portable computers 1, 31 and 41 of the first to third embodiments are denoted by the same reference numerals, and explanations thereof are omitted.

An air vent portion 11 of the portable computer 51 has a first sidewall portion 21, a ceiling wall portion 22, and a pair of sidewall portions 23a and 23b. Air vents 24 are provided in the first sidewall portion 21. The air vent portion 11 is formed to satisfy the relationship of the expression (1).

Liquid discharge holes 32 are provided in a bottom wall 6c of the portable computer 51. The portable computer 51 has a heat-radiating member 43, and a heat pipe 42 as an example of a heat-transfer member. The heat-radiating member 43 is disposed above the liquid discharge holes 32 and opposed to the liquid discharge holes 32. The portable computer 51 does not have a bank provided around the liquid discharge holes 32.

Next, an example of dimensional relationship between the air vent portion 11 and the liquid discharge holes 32 is explained with reference to FIG. 12. The dimensional relationship explained in the fourth embodiment is an example of the present invention, and embodiments of the present invention are not limited to it.

Figure 12:
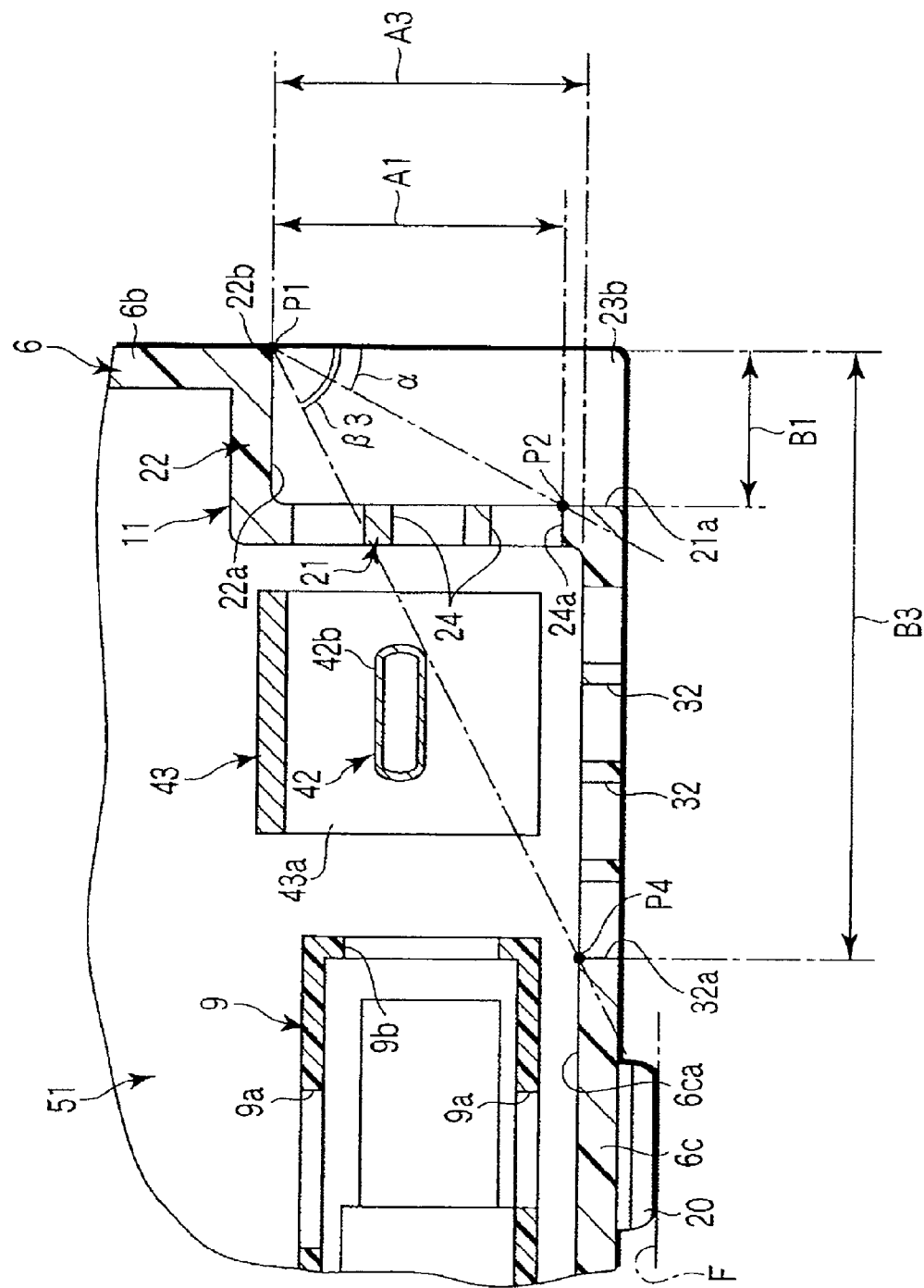
FIG. 12 is an exemplary cross-sectional view of the portable computer of the fourth embodiment, taken along line F12-F12 of FIG. 11.

As shown in FIG. 12, a vertical distance between an upper surface 6ca of the bottom wall 6c and a lower surface 22a of the ceiling wall portion 22 is defined as length A3. A horizontal distance between an edge 32a of the liquid discharge holes 32, which is most distant from the first sidewall portion 21 among edges of the liquid discharge holes 32, and an outer edge 22b of the ceiling wall portion 22 is defined as length B3. The length A3 and the length B3 are set to satisfy the relationship of the following expression (3).

$$\text{length } B3 \geq \text{length } A3 \times \tan(60°), (\tan(60°) = \sqrt{3}) \quad \text{Expression (3)}$$

The "edge 32a of the liquid discharge holes 32, which is most distant from the first sidewall portion 21" indicates an opening edge of a liquid discharge hole 32 most distant from the first sidewall portion 21 among the liquid discharge holes 32 provided in the bottom wall 6c, and an edge 32a more distant from the first sidewall portion 21 in the opening edge (hereinafter referred to as "inner edge 32a"). The number of liquid discharge holes 32 does not always have to be two or more. Only one liquid discharge hole 32 may be provided. In the case of providing only one liquid discharge hole 32, the length B3 is a horizontal distance between an edge 32a of the only one liquid discharge hole 32, which is more distant from the first sidewall portion 21, and the outer edge 22b of the ceiling wall portion 22.

The above relationship can also be expressed as follows. If an angle formed between a straight line, which connects a lower end P1 of the outer edge 22b of the ceiling wall portion 22 with an upper end P4 of the inner edge 32a of the liquid discharge hole 32, and the vertical line is defined as angle β3, the angle β3 is larger than 60°.

According to the portable computer 51 including the above structure, the liquid proof around the air vents 24 is improved. Specifically, the portable computer 51 according to the fourth embodiment has the ceiling wall portion 22 and the second sidewall portions 23a and 23b. This structure improves the liquid proof for the same reason as that in the first embodiment. Further, the portable computer 51 has the liquid discharge holes 32. This structure improves the liquid proof for the same reason as that in the second embodiment. Furthermore, since heat-radiating member 43 is disposed above the liquid discharge holes 32, downsizing of the housing 6 is achieved.

Since the air vent portion 11 and the liquid discharge holes 32 are formed to satisfy the above expression (3), liquid dripping slantingly with an angle smaller than 60° with respect to the vertical line is discharged outside the housing 6 through the liquid discharge holes 32. Specifically, in the portable computer 51 according to the fourth embodiment, there is little possibility that liquid dripping within a range of 60° on both sides of the vertical line adhere to units and modules mounted inside the housing 6. Therefore, the portable computer 51 satisfies the requirements of JIS Level 3 (rainproof type) provided by JIS C 0920.

In summary, the portable computer 51 has liquid proof against liquid dripping with an angle within 60° with respect to the vertical line, with a level that mounted modules are not adversely affected by liquid even when the liquid may enter the housing 6. Further, the portable computer 51 has liquid proof against liquid dripping with an angle within 15° with respect to the vertical line, with a level that the drips are prevented from entering the housing 6.

Next, a portable computer 61 serving as an electronic apparatus according to a fifth embodiment of the present invention is explained with reference to FIGS. 13 to 15. Constituent elements having the same functions as those of the portable computers 1, 31, 41 and 51 of the first to fourth embodiments are denoted by the same reference numerals, and explanations thereof are omitted.

As shown in FIG. 13, a sidewall portion 62 in which air vents 24 are opened is aligned with a peripheral wall 6b. Specifically, the sidewall portion 62 provided with the air vents 24 is on the same plane as the peripheral wall 6b. In other words, the portable computer 61 does not have a ceiling wall portion serving as an eave.

Liquid discharge holes 32 are opened in a part of a bottom wall 6c, which is adjacent to the sidewall portion 62. As shown in FIG. 14, the portable computer 61 has a bank 33, a heat-radiating member 43, and a heat pipe 42 as an example of a heat-transfer member. Second standing walls 35a and 35b of the bank 33 extend toward the peripheral wall 6b, and are connected to the internal surface of the peripheral wall 6b.

Next, an example of dimensional relationship between the air vents 24 and the bank 33 is explained with reference to FIG. 15. The dimensional relationship explained in the fifth embodiment is an example of the present invention, and embodiments of the present invention are not limited to it.

Figure 15:
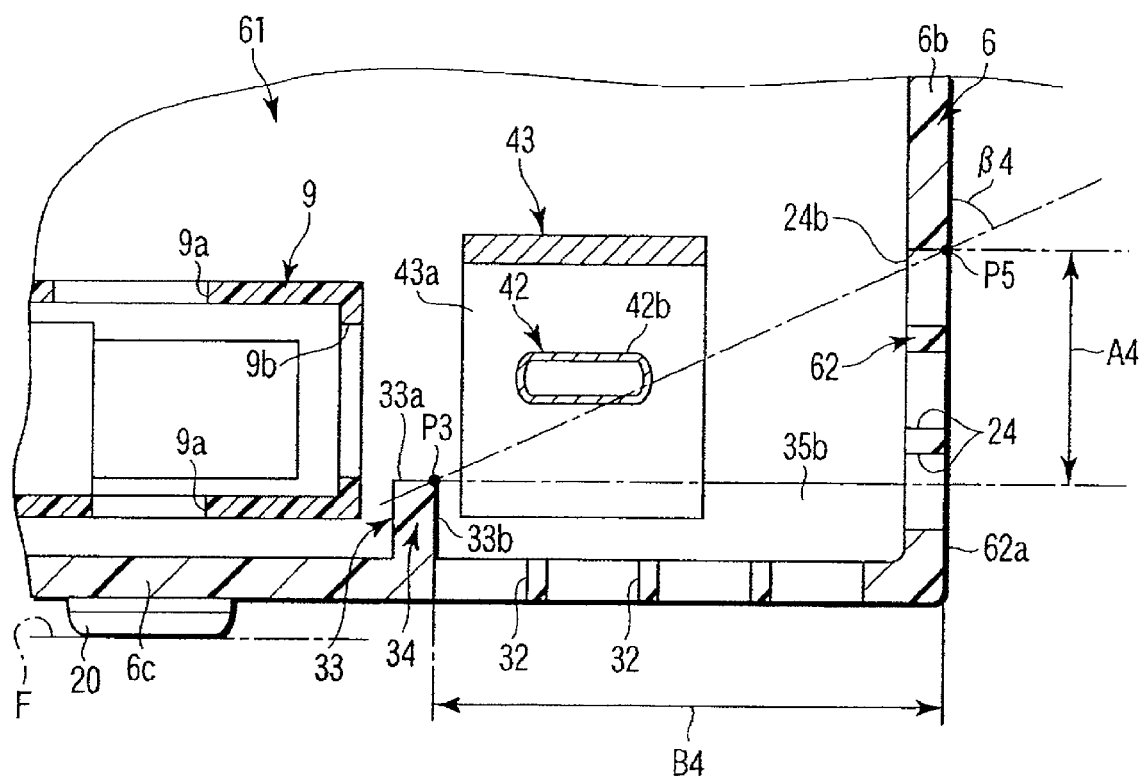
FIG. 15 is an exemplary cross-sectional view of the portable computer of the fifth embodiment, taken along line F15-F15 of FIG. 13.

As shown in FIG. 15, a vertical distance between an upper end 24b of an opening edge of an air vent 24 located uppermost among the air vents 24 (hereinafter referred to as "uppermost edge 24b") and an upper end 33a of the bank 33 is defined as length A4. A horizontal distance between a side surface 33b of the bank 33, which is opposed to the sidewall portion 62, and an outer surface 62a of the sidewall portion 62 is defined as length B4. The length A4 and the length B4 are set to satisfy the relationship of the following expression (4).

$$\text{length } B4 \geq \text{length } A4 \times \tan(60°), (\tan(60°) = \sqrt{3}) \quad \text{Expression (4)}$$

If only one air vent 24 is provided, the length A4 is a distance between the uppermost edge 24b of the only one air vent 24 and the upper end 33a of the bank 33.

The above relationship can also be expressed as follows. Specifically, if an angle formed between a straight line, which connects an outer edge P5 of the uppermost edge 24b of the uppermost air vent 24 with an upper end P3 of the side surface 33b of the bank 33, and the vertical line is defined as angle β4, the angle β4 is larger than 60°. The "outer edge" of the uppermost edge 24b of the air vent 24 is an outermost edge in the uppermost edge 24b of the air vent 24 with respect to the housing 6.

According to the portable computer 61 including the above structure, the liquid proof around the air vents 24 is improved. Specifically, the portable computer 61 of the fifth embodiment has the bank 33 and the liquid discharge holes 32. Thereby, the liquid proof is increased for the same reason as that of the second embodiment. Further, since the heat-radiating member 43 is disposed above the liquid discharge holes 32, downsizing of the housing 6 is achieved.

Since the air vents 24 and the bank 33 are formed to satisfy the relationship of the above expression (4), the portable computer 61 satisfies the requirements of JIS Level 3 (rainproof type) provided by JIS C 0920 for the same reason as that of the second embodiment.

Figure 16:
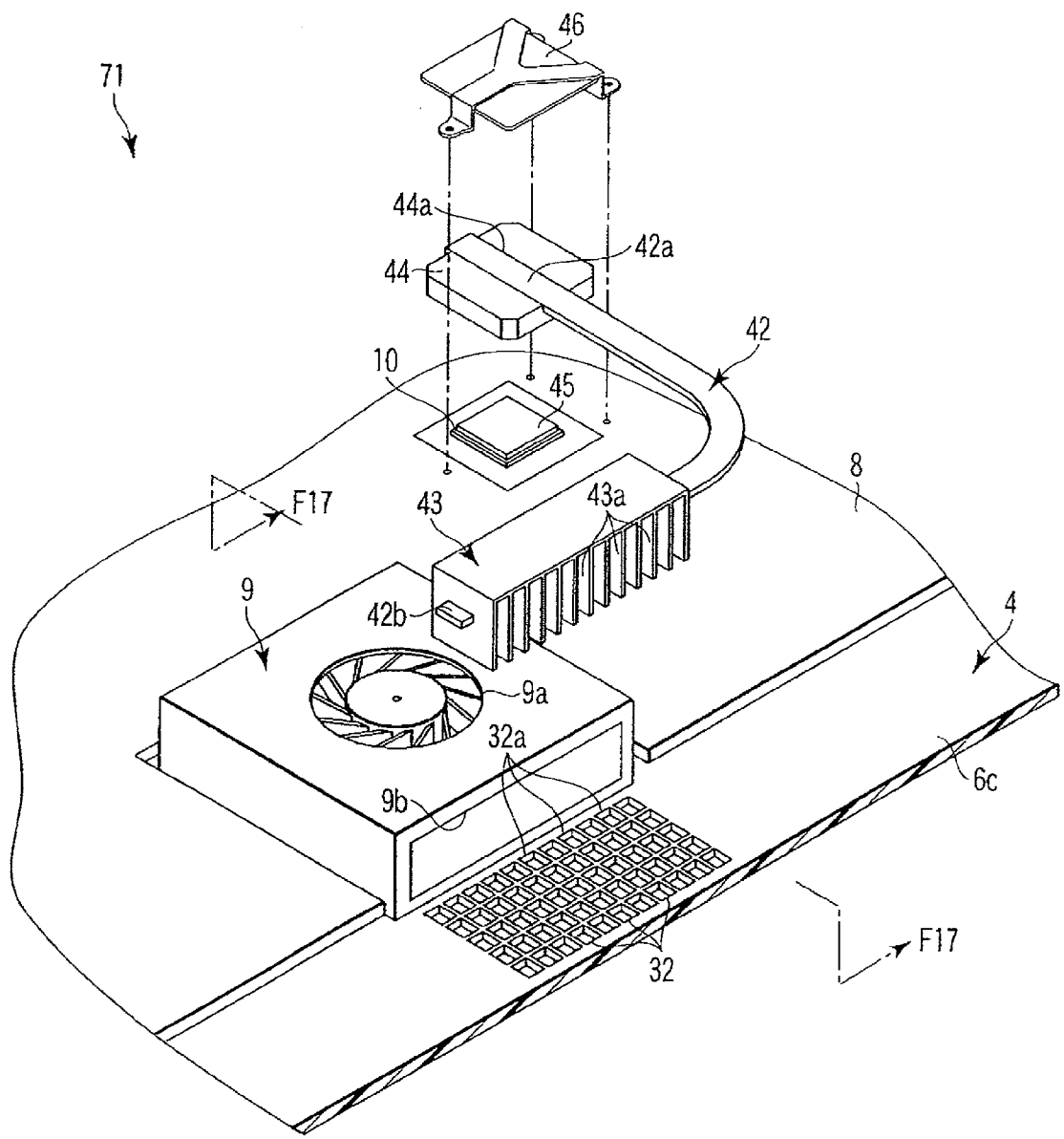
FIG. 16 is an exemplary perspective view of the inside of a portable computer according to a sixth embodiment of the invention.

Next, a portable computer 71 serving as an electronic apparatus according to a sixth embodiment of the present invention is explained with reference to FIGS. 16 and 17. Constituent elements having the same functions as those in the portable computers 1, 31, 41, 51 and 61 of the first to fifth embodiments are denoted by the same reference numerals, and explanations thereof are omitted.

The portable computer 71 has a sidewall portion 62 in which air vents 24 are opened, and a bottom wall 6c in which liquid discharge holes 32 are opened. The portable computer 71 also has a heat-radiating member 43, and a heat pipe 42 as an example of a heat-transfer member.

Next, an example of dimensional relationship between the air vents 24 and the liquid discharge holes 32 is explained with reference to FIG. 17. The dimensional relationship explained in the sixth embodiment is an example of the present invention, and embodiments of the present invention are not limited to it.

Figure 17:
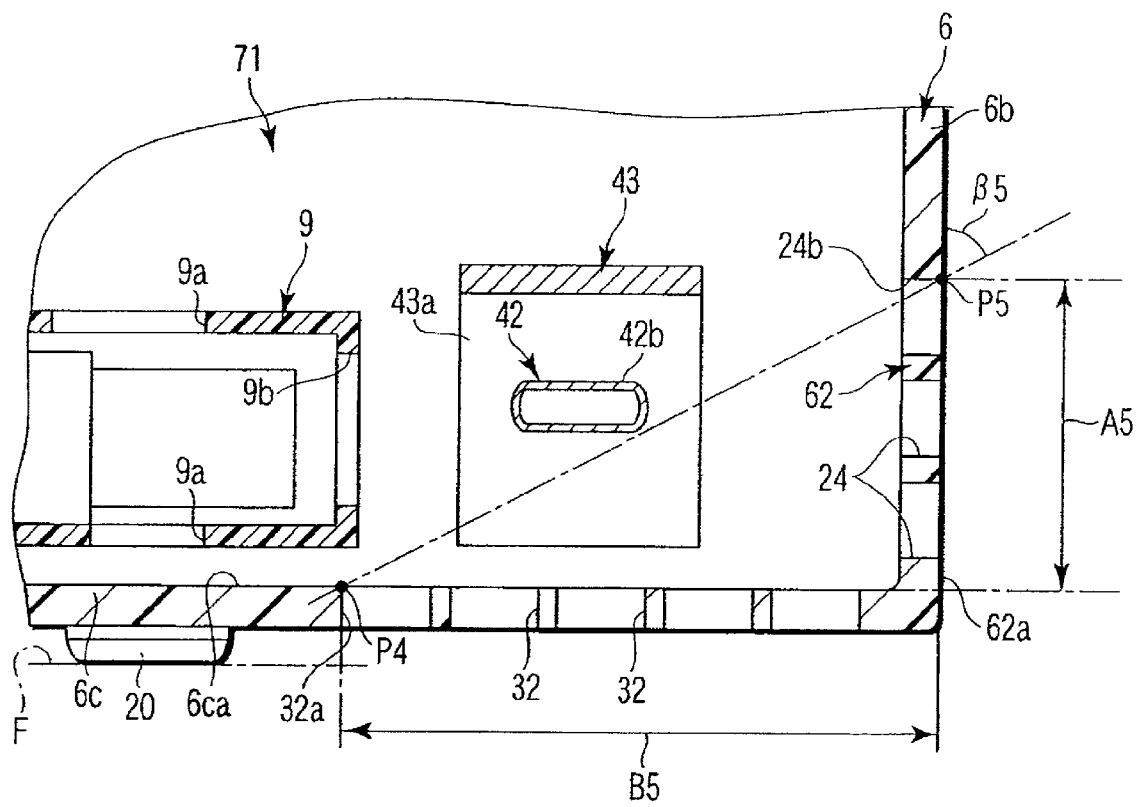
FIG. 17 is an exemplary cross-sectional view of the portable computer of the sixth embodiment, taken along line F17-F17 of FIG. 16.

As shown in FIG. 17, a vertical distance between an upper end 24b of an opening edge of an air vent 24 located uppermost among the air vents 24 and an upper surface 6ca of the bottom wall 6c is defined as length A5. A horizontal distance between an edge 32a of the liquid discharge holes 32, which is most distant from the sidewall portion 62 among the edges of the liquid discharge holes 32, and an outer surface 62a of the sidewall portion 62 is defined as length B5. The length A5 and the length B5 are set to satisfy the relationship of the following expression (5).

$$\text{length } B5 \geqq \text{length } A5 \times \tan(60°)(\tan(60°)=\sqrt{3}) \qquad \text{Expression (5)}$$

If only one air vent 24 is provided, the length A5 is a distance between the uppermost edge 24b of the only one air vent 24 and the upper surface 6ca of the bottom wall 6c.

The above relationship can also be expressed as follows. Specifically, if an angle made between a straight line, which connects an outer edge P5 of the uppermost edge 24b of the uppermost air vent 24 with an upper end P4 of the inner edge 32a of the liquid discharge hole 32, and the vertical line is defined as angle β5, the angle β5 is larger than 60°.

According to the portable computer 71 having the above structure, the liquid proof around the air vents 24 is improved. Specifically, the portable computer 71 of the sixth embodiment has the liquid discharge holes 32. Thereby, the liquid proof is increased for the same reason as that of the fourth embodiment. Further, since the heat-radiating member 43 is disposed above the liquid discharge holes 32, downsizing of the housing 6 is achieved.

Since the air vents 24 and the liquid discharge holes 32 are formed to satisfy the relationship of the above expression (5), the portable computer 71 satisfies the requirements of JIS Level 3 (rainproof type) provided by JIS C 0920 for the same reason as that of the fourth embodiment.

Embodiments of the present invention are not limited to the portable computers 1, 31, 41, 51, 61 and 71 of the first to sixth embodiments explained above. The constituent elements adopted in the above embodiments can be used in combination as required.

For example, embodiments of the present invention are preferably adjusted to standards of countries in which the present invention is to be used, such as MIL and standards provided by IEC (International Electrotechnical Commission). For example, if there is a standard of liquid proof that "not adversely influenced by liquid dripping within a range of angle θ with respect to the vertical line", the dimensions may be set as follows. Specifically, the lengths A1 to A5 and B2 to B5 are set such that one of the angles α, β2, β3, β4, and β5 in the first to sixth embodiments is larger than the angle θ, and thereby the above standard is satisfied.

Figure 18:
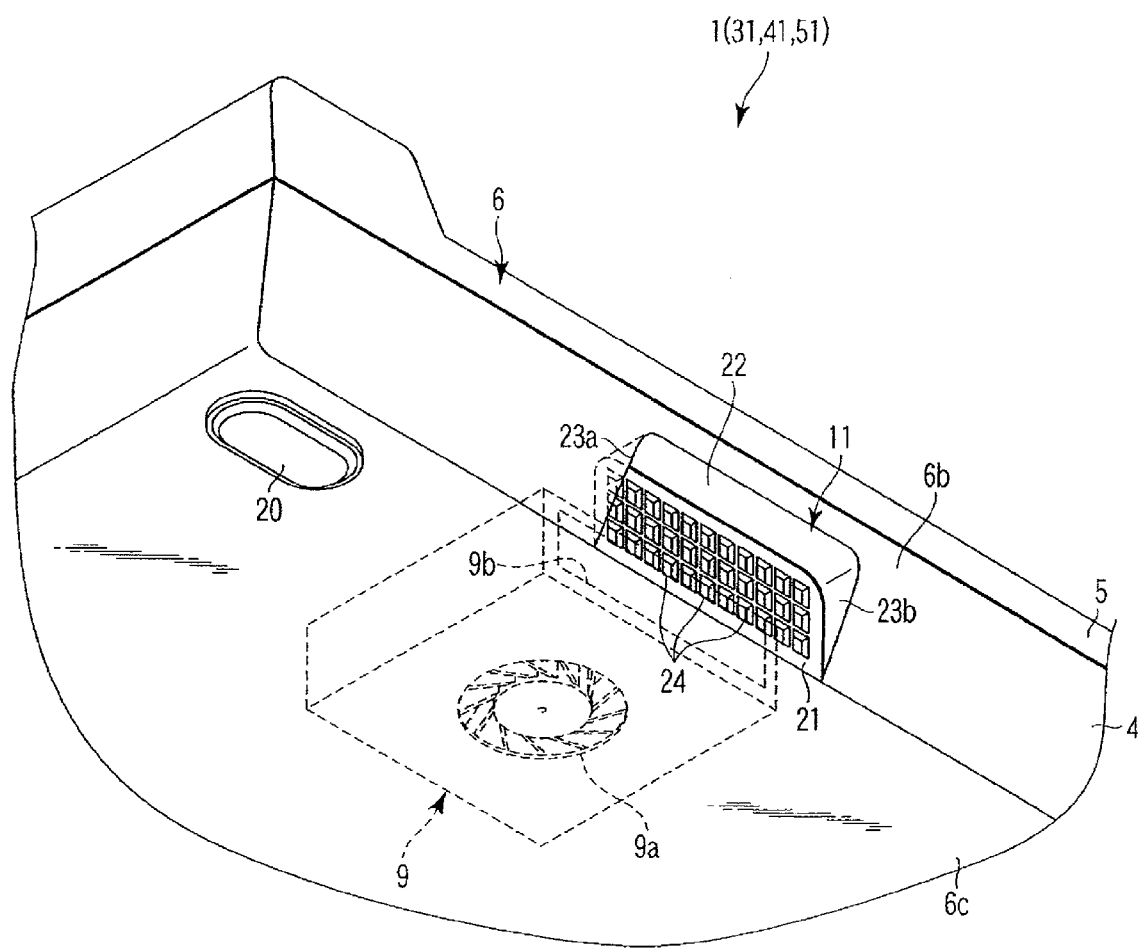
FIG. 18 is an exemplary perspective view of a modification of the portable computers according to first to fourth embodiments.

For example, the second sidewall portions 23a and 23b of the air vent portions 11 may be formed to gradually narrow toward the bottom, as shown in FIG. 18. It suffices that a width of a horizontally widest part of each of the second sidewall portions 23a and 23b is at least larger than the thickness of the peripheral wall 6b. Further, the second sidewall portions 23a and 23b may be omitted.

Air vents to which the present invention is applicable are not limited to air vents for discharging the air from the cooling fan. Further, electronic apparatuses to which the present invention is applicable are not limited to portable computers. For example, the present invention is also applicable to digital cameras, video cameras, and other electronic apparatuses.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a housing comprising a sidewall portion and a bottom wall, portion adjacent to the side wall portion, the sidewall portion comprising an air vent, the bottom wall portion comprising a plurality of liquid discharge holes disposed in the direction from the sidewall portion toward an inner portion of the housing, the liquid discharge holes for discharging liquid that enters the housing through the air vent, a direct liquid path existing between the air vent and the liquid discharge holes,
    a circuit board in the housing;
    a heat-generating component on the circuit board, the heat-generating component being displaced from the direct liquid path;
    a heat-transfer member having a first end thermally connected to the heat-generating component;
    a heat-radiating member thermally connected to a second end of the heat-transfer member and horizontally displaced from the heat-generating component; and
    a cooling fan for cooling the heat-radiating member,
    wherein at least a portion of the liquid discharge holes are located directly below at least a portion of the heat-radiating member, and wherein the liquid discharge holes are between the air vent and the cooling fan.

2. The electronic apparatus of claim 1, wherein a direct liquid path exists between the heat-radiating member and the liquid discharge hole.

3. The electronic apparatus of claim 1, wherein the heat-radiating member comprises a plurality of fins having clearances defined therebetween, the clearances opening downwardly.

4. The electronic apparatus of claim 1, wherein the ratio of the horizontal distance between an edge of the liquid discharge hole that is most distant from the sidewall portion and an outer edge of the sidewall portion is $\sqrt{3}$ times as large as the vertical distance between an uppermost edge of the air vent and the bottom wall portion.

5. The electronic apparatus of claim 1, wherein the liquid discharge holes are located adjacent where air is discharged by the cooling fan to the outside of the housing.

6. An electronic apparatus comprising:
    a housing comprising a sidewall portion and a bottom wall, portion adjacent to the side wall portion, the sidewall portion comprising an air vent, the bottom wall portion comprising a two-dimensional array of liquid discharge holes for discharging liquid that enters the housing through the air vent, a direct liquid path existing between the air vent and the array of liquid discharge holes,
    a circuit board in the housing;
    a heat-generating component on the circuit board, the heat-generating component being displaced from the direct liquid path;

a heat-transfer member having a first end thermally connected to the heat-generating component;

a heat-radiating member thermally connected to a second end of the heat-transfer member and horizontally displaced from the heat-generating component; and a cooling fan for cooling the heat-radiating member, wherein at least a portion of the liquid discharge holes are located directly below at least a portion of the heat-radiating member, and wherein the array of liquid discharge holes is between the air vent and the cooling fan.

* * * * *